United States Patent [19]

Cunningham et al.

[11] Patent Number: 4,970,609
[45] Date of Patent: Nov. 13, 1990

[54] CLOCKING METHOD AND APPARATUS FOR USE WITH PARTIAL RESPONSE CODED BINARY DATA

[75] Inventors: Earl A. Cunningham; Townsend H. Porter, Jr.; James W. Rae, all of Rochester, Minn.

[73] Assignee: International Business Machines Corporation, Armonk, N.Y.

[21] Appl. No.: 258,937

[22] Filed: Oct. 17, 1988

[51] Int. Cl.⁵ .............................................. G11B 5/09
[52] U.S. Cl. ....................................... 360/51; 360/46
[58] Field of Search ........................ 360/51, 46, 40, 67

[56] References Cited

U.S. PATENT DOCUMENTS

| 4,504,872 | 3/1972 | Petersen. | |
| 4,528,601 | 7/1985 | Moriyama et al. | 360/46 |
| 4,837,642 | 6/1989 | Smidth | 360/46 |

OTHER PUBLICATIONS

C. Coleman, D. Lindhol, D. Peterson & R. Wood, "High Data Rate Magnetic Recording in a Single Channel", 2–5 Apr. 1984, pp. 151–157. *Institute of Electronic and Radio Engineers.*
R. Wood, S. Anlgrim, K. Hallamsek, & R. Stenerson, "An Experimental Eight–Inch Disc Drive with One-- Hundred Megabytes Per Surface", Sep. 1984, vol. Mag-20, No. 5, pp. 698–702, *IEEE Transactions on Magnetics.*
P. Kabal & S. Pasupathy, "Partial–Response Signaling", Sep. 1975, pp. 921–033. IEEE Transactions on Communications, vol. Com-23, No. 9.
H. Kobayashi & D. T. Tang, "Application of Partial–Response Channel Coding to Magnetic Recording Systems", Jul. 1970,. pp. 368–375, *IBM Journal of Research and Development.*

*Primary Examiner*—Vincent P. Canney
*Attorney, Agent, or Firm*—Robert W. Lahtinen; F. A. Sirr

[57] ABSTRACT

Clocking of Class IV partial response coded binary data is provided by way of circuit means that includes two analog threshold detectors. One detector is responsive to the analog read signal's positive-going amplitude corssing a a preset positive threshold value. The other detector is responsive to the read signal's negative-going amplitude crossing a preset negative value. The time of occurrence of both detector crossing transitions is phase-compared to a clock signal, and a phase error signal is generated for each detector, if a phase error exists. The two phase error signals are integrated by the use of a loop filter. The integrated phase error signal is then used to adjust the phase of a clock signal generator. The output of the clock signal generator is used to accurately clock, and to enable accurate recover of, the binary data that was originally encoded and written in accordance with the Class IV partial responsive coding convention.

29 Claims, 3 Drawing Sheets 4,970,609

CLOCKING METHOD AND APPARATUS FOR USE WITH PARTIAL RESPONSE CODED BINARY DATA

FIELD OF THE INVENTION

This invention relates to the field of magnetic recording of binary data, and specifically to a method and apparatus for providing a clock signal usable in the detection of an analog read signal that is generated by magnetically reading binary data that has been coded and then magnetically recorded in accordance with the convention known as partial response signaling.

BACKGROUND OF THE INVENTION

A number of attempts to improve the linear density (bits per millimeter, or bpmm) of binary data that can be reliably written on magnetic media, for example disks, exist in the art. One of these techniques is known as partial response coding or signaling.

The publication *IEEE Transactions on Communications*, Vol. Com-23, No. 9, September 1975, describes a number of partial response systems, which systems provide either 3 signal levels or 5 signal levels. This publication is incorporated herein by reference for its background teaching of partial response signaling.

The publication *IBM Journal of Research and Development*, July 1970, at pages 368-375, describes the "Application of Partial-response Channel Coding to Magnetic Recording Systems". This publication is also incorporated herein by reference.

Partial response signaling (sometimes called correlative level coding) is a form of pulse amplitude modulation that is used to convey digital information, wherein the effect of a known amount of intersymbol interference can be eliminated, because the interference is a known quantity.

Class IV partial response coding (PRIV) is a particular 3 signal level class of this coding technique (i.e. equivalent signal levels +1, 0 and −1). PRIV is a technique with which the present invention finds utility. As those skilled in the art will appreciate, the present invention can be readily extended to other techniques, such as the 5 signal level technique above mentioned, as by the use of 4 threshold circuits, rather than the use of two threshold circuits as disclosed herein for use with a 3 signal level PRIV technique. Stated differently, a partial response coding technique having N+1 critical signal levels requires N threshold circuit paths of the invention.

U.S. Pat. No. 4,504,872 is incorporated herein by reference with respect to its discussion of Class IV partial response signalling technique.

Whatever the prior partial response technique that was used to code and then magnetically record the binary data, subsequent reading of the magnetic media, and detection of the resulting analog read signal, requires the use of a clocking means in order to place the binary 1's and 0's in their proper time positions. This enables the original binary data to be reconstructed or recovered from the analog read signal.

A well known prior method of detecting magnetically recorded binary data is to detect the time-position of analog read signal peak magnitudes (i.e. recorded transitions), and then relate the time-positions of these peak magnitudes to a standard clock that is continuously synchronized with the binary data being recovered. This clock establishes sequential data sample periods or windows into which the read signal's continuously changing amplitude is mapped as binary 1's and 0's.

In these well known detecting schemes, the binary data has been coded (for example, NRZI coding) such that the recorded binary pattern has sufficient signal transitions to maintain the correct clock frequency. The clocking function for such a prior system is usually provided by a variable frequency oscillator (VFO), or a voltage controlled oscillator (VCO).

In these prior self clocking systems, when the time-position of the peaks in the analog read signal are determined to be out of phase with the clock transitions, a current is produced whose magnitude is proportional to this phase error. The phase error current is then averaged, filtered, or integrated, and the result is used to adjust the clock in a manner to reduce the phase error to zero.

Advanced coding techniques, of which Class IV partial response is an example, intentionally provide controlled intersymbol interference. This interference provides a read signal whose peak amplitudes are sometimes properly time-positioned, and at other times are positioned between data sample times, depending upon the particular data stream being read or received. While these advanced techniques have the advantage of providing high data packing rates, they complicate the generation of a data clocking signal.

For example, detection of partial response coded binary data results in critical analog read signal amplitudes and/or peaks sometimes occurring at clock-determined sample points, and sometimes occurring between these sample points. This variation in timing is due to the large partial response intersymbol interference, which interference, in accordance with these advanced coding techniques, is used in a constructive manner for coding efficiency. However, this same timing variation makes the use of conventional VFO/VCO detection techniques difficult, at best.

Some prior art partial response detection schemes use a separate, highly equalized signal channel, in an attempt to move the signal peaks back toward the time-position in which they were originally recorded. This arrangement generates electronic noise, tending to make this separate channel's signal useless for data detection, but usually adequate for controlling the VFO/VCO. In these schemes, the phase between the separate signal channel for controlling the VFO/VCO, and another separate signal channel that is used for data detection, must be compensated. As a result of a change in circuit components with age, the system tends to degrade with time, due to phase error. Another problem that can occur with this scheme is that the noise that is generated in the VFO/VCO signal channel may cause the clock's data detection window to shift in the wrong direction.

An example of prior art partial response detection schemes can be found in the publication *IEEE Transactions on Magnetics*, September 1984, VOL. MAG-20, Number 5, at pages 698—702.

A prior art class IV detection scheme whose clock recovery is based upon threshold crossing detection of the ternary waveform is described in an article entitled "High Data Rate Magnetic Recording in a Single Channel", found in the publication *Fifth International Conference on Video and Data Recording*, Apr. 2—5, 1984, at pages 151-157. While this publication describes threshold detection at two values identified as plus 1 and minus 1, these two values being one half of the nominal signal level, no suggestion is made in this publication relative the use of phase detectors, which are responsive to the outputs of the threshold detectors and to the output of a clock, the outputs of the phase detectors in turn controlling the clock, as is taught by the present invention.

SUMMARY OF THE INVENTION

The present invention employs a number of threshold detection channels in a unique manner, enabling a read signal of the partial response type to be accurately clocked.

In preferred embodiments of the invention, each of the plurality of threshold detection channels comprises a threshold detector, an edge detector and a charge pump. The outputs of the plurality of charge pumps come together at the input of a loop filter. The output of the loop filter controls a detection clock. The output of the detection clock is applied as a second input to the phase detector of each of the plurality of threshold detection channels.

The analog read signal that is derived from reading a magnetic track that has been recorded by the use of an advanced coding partial response technique, provides N critical signal amplitudes. In the Class IV partial response technique, N=3, and the signal is known to vary from a positive amplitude peak, whose magnitude will be defined as about +1.4, to a negative amplitude peak, relatively defined herein as −1.4. As will be apparent, when this invention is used with Class IV partial response signaling, a pair of threshold means respond to relative signal magnitudes defined as +1 and −1.

The invention will be described with reference to exemplary partial response coding wherein the presence of a "0" signal level or magnitude at a check point represents a binary "0", and the presence of a "+1" or a "−1" signal magnitude at a data check point represents a binary "1". However, the invention has greater utility, and it is not to be limited to this specific Class IV partial response coding convention.

In accordance with the present invention, two threshold detectors or detector paths are provided, one being a positive (less-than-plus-one, for example, +½) threshold detector and the other being a negative (greater-than-minus-one, for example −½) threshold detector. In this way, the invention is responsive to the three signal magnitudes.

If the signal magnitude is less than that required by the positive threshold detector, while at the same time being greater than that required by the negative threshold detector, a binary data "0" is indicated or decoded.

If the signal magnitude is either greater than that required by the positive threshold detector, or less than that required by the negative threshold detector, a binary data "1" is indicated.

In such a +1/0/−1 amplitude signaling system, when a positive threshold is established, for example midway between the +1 magnitude and the zero magnitude, the signal will pass through this positive threshold at a time that is about midway between the time of occurrence of the signal's +1 magnitude and the time of occurrence of the signal's zero magnitude. The same is true when a negative threshold is established midway between the signal's −1 magnitude and its zero magnitude.

For Class IV partial response read signals that are properly equalized, +1 and/or −1 signal pulses are of near perfect symmetry. Thus, any time-offset of a threshold crossing on a rising edge of such a pulse is compensated for by an opposite time-offset on the threshold crossing that occurs on the descending edge of the same pulse. The maximum time offset that can occur as a result of such a pulse waveform has been shown to be less than 30% of a detection window's time period.

A Class IV partial response read signal waveform that crosses between a +1 magnitude and a −1 magnitude (or visa versa) within one clock cell will cross both thresholds within the window's time period, the first crossing being earlier than halfway in the cell, and the second crossing being later than halfway in the cell. The average of the time-offset for these multiple threshold crossings has been shown to be very close to zero. The average time variation from the center of the cell is not random, but tends to be paired, so as to rapidly average near zero, with only a small number of samples. This is true because it is not possible to have multiple successive offsets in the same direction in this multiple crossing situation.

In accordance with the invention, the crossings of one detector (in the case of an equalized read signal pulse), and the crossings of both detectors (in the case of an equalized read signal waveform that crosses between +1 and −1, or visa versa, in one cell window), are used to develop timing comparisons to a VFO/VCO generated clock signal.

The present invention combines the detected times of multiple threshold crossings, by providing a phase comparator for each of the multiple (for example, two) threshold detectors. In this manner, correction electrical effects (for example currents) are provided by each of the multiplicity of phase detectors. All such electrical effects are fed into a common filter, integrator, or the like, in order to average the multiplicity of electrical effects. This resulting average effect (i.e. average current) is then applied to the clock as a control parameter (for example, as a control voltage to a VCO).

Due to the close time spacing of the binary data that result from the partial response coding technique, and due to the resulting multiple crossings of the detector thresholds, a large number of clock correction signals (phase error signals) are provided by the invention. The filter/integrator of the invention is constructed and arranged to average this large number of correction signals.

The method and apparatus of the present invention is implemented by way of (1) a controllable data detection clock having a control input and a clock output, (2) a plurality of threshold detectors, each individual one of the detectors having an input and an output, and each one being responsive to an analog partial response input signal threshold that is related to an individually different one of the plurality of signal levels in a partial response signal, (3) a plurality of phase detectors, each one of which has two inputs and an output, (4) connecting the output of each individual one of the threshold detectors to the first input to an individual one of the phase detectors, (5) connecting the output of the data detection clock as a second input to each individual one of the phase detectors, the plurality of phase detectors thereby providing a like plurality of individual phase error outputs, and (6) connecting the phase error outputs as a controlling input to the data detection clock source.

It is an object of the present invention to provide a clocking construction and arrangement for use with partial response coded binary data wherein a conventional VFO or VCO is usable, and wherein a separate signal channel is not required.

It is another object of the invention to provide an analog VFO/VCO detection scheme that correctly centers binary data detection windows in a simple and an accurate manner, thus optimally enabling detection of partial response encoded binary data.

Another object of the invention is to provide a method and apparatus for synchronizing a clock to a partial response signal by the use of a multiplicity of threshold detector/phase detector paths.

Yet another object of the invention is to provide a plurality of threshold detection channels, each of which includes a threshold detector, an edge detector and a charge pump, wherein the outputs of the plurality of charge pumps are connected to the input of a common loop filter, and wherein the output of the loop filter controls a detection clock, the output of the detection clock being in turn connected as a second input to the phase detector of each of the plurality of threshold detection channels.

These and other objects and advantages of the invention will be apparent to those of skill in the art upon reference to the following detailed description of the invention, which description makes reference to the drawing.

BRIEF DESCRIPTION OF THE DRAWING

In FIG. 1, the amplitude axis values to the left of the figure are used in association with the solid-line analog read signal. The amplitude axis values to the right of the figure are used in association with the upper dotted-line output of the invention's positive threshold detector, and in association with the lower dotted-line output of the invention's negative threshold detector.

DETAILED DESCRIPTION OF THE INVENTION

The present invention will be described with reference to only one of the known partial response signaling techniques, namely Class IV partial response signaling. However, the scope and content of the invention is not to be limited thereto.

In addition, the analog read signal that is derived from reading a magnetic track that has been recorded in accordance with this Class IV technique will be assumed to have been subjected to both signal equalization techniques and gain control techniques. As a result, the read signal amplitudes will have been normalized to sample-time amplitudes characterized herein as $+1$ and $-1$. Exemplary thresholds of the invention are then defined as $+\frac{1}{2}$ and $-\frac{1}{2}$. However, the scope and content of the invention is not to be limited to such assumed peak signal and threshold relationships.

Figure 1:
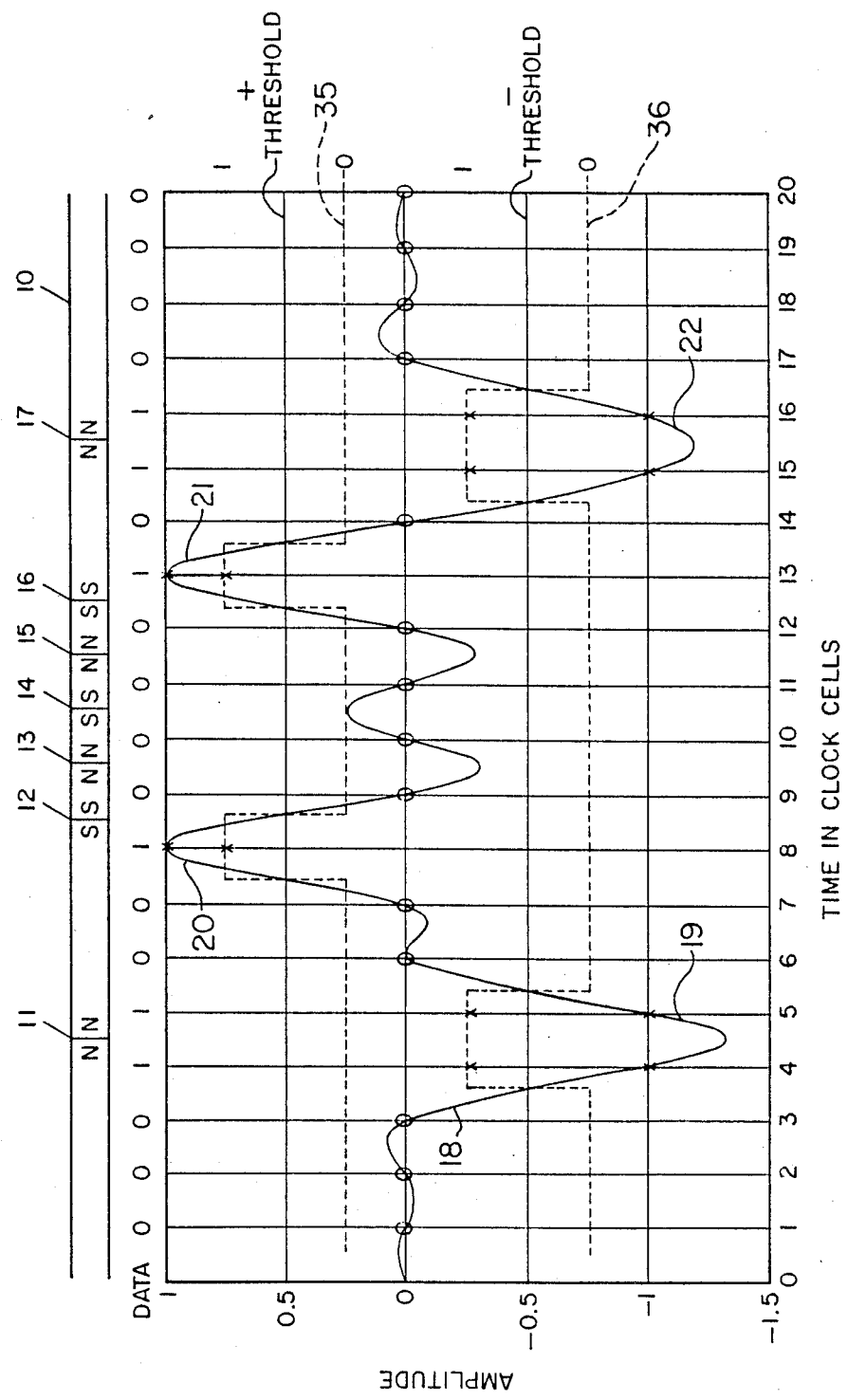
FIG. 1 shows a representative magnetic recording track wherein a binary data stream "000110010000101110000" has been recorded using the partial response IV signaling technique. This figure shows in solid-line the analog read signal that is derived from reading this track, and shows the read signal's magnitude relationship relative exemplary $+\frac{1}{2}$ and $-\frac{1}{2}$ threshold detectors of the invention. In this figure, evenly spaced signal sample times "0 to 20" are shown, these sample times defining clock cells, as is shown in the figure.

With reference to FIG. 1, reference numeral 10 designates a magnetic recorded track having magnetic transitions 11-17. The magnetic transitions are recorded in accordance with data sample times (which define clock cells) that are identified as "0 to 20" in FIG. 1.

The binary information content recorded in track 10 is an exemplary "000110010000101110000". This binary data is an encoded data pattern having restrictions on the number and placement of zeros that are allowed using a baseband encoding of an 8 out of 9 code. This data is further encoded to obtain the proper positions to record the magnetic transitions 11-17 as shown in FIG. 1.

Solid-line waveform 18 of FIG. 1 is a representative analog read signal that is derived from reading track 10. For purposes of simplicity, it will be assumed that signal 18 has been subjected to well known signal equalization and gain control techniques, by way of circuit means that are not shown or described herein.

The north-to-north magnetic transition (N-N) 11 that occurs between data sample times 4 and 5 produces a negative signal peak 19. Peak 19 yields a signal magnitude equal to $-1$ at sample times 4 and 5. Due to the fact that the next S-S transition 12 is spaced four data sample times from transition 11, and also due to the equalization that has been applied to analog signal 18, the amplitude of signal 18 at sample times 6 and 7 is of a zero magnitude.

Magnetic transitions 12-16 are closely spaced, one sample time apart. As a result, only the leading half of the read signal that is produced by magnetic transition 12, and the trailing half of the read signal that is produced by magnetic transition 16, provide $+1$ signal peaks 20 and 21, respectively.

Note that the read signal cancelations that occur as a result of reading closely adjacent magnetic transitions 12, 13, 14, 15 and 16 produce signal amplitudes that are zero at data sample times 9, 10, 11 and 12.

Magnetic transitions 16 and 17 are spaced three sample times apart. As a result, transition 17 produces a negative signal peak 22 having a $-1$ magnitude at sample times 15 and 16, with no substantial signal cancellation occurring.

Note that at data sample times 1, 2 and 3, a binary "0" is recorded by the absence of a magnetic transition, whereas at data sample times 9, 10, 11 and 12, a binary "0" is recorded by the use of closely adjacent, read signal canceling, magnetic transitions 12, 13, 14, 15 and 16.

In accordance with the present invention, two threshold detector means, one being the comparison (31) between signal 18 and the positive threshold designated in FIG. 1 as a "+ threshold", and the other being the comparison (32) between signal 18 and the negative threshold designated in FIG. 1 as a "— threshold", are used to detect the binary "1's" that are recorded at data sample times 4, 5, 8, 13, 15 and 16. In the exemplary Class IV partial response signaling scheme, the absence of a signal amplitude that exceeds one of these two thresholds at a sample time is decoded as a binary 0, as is shown at data sample times 1, 2, 3, 6, 7, 9, 10, 11, 12, 14, 17, 18, 19 and 20.

Figure 2:
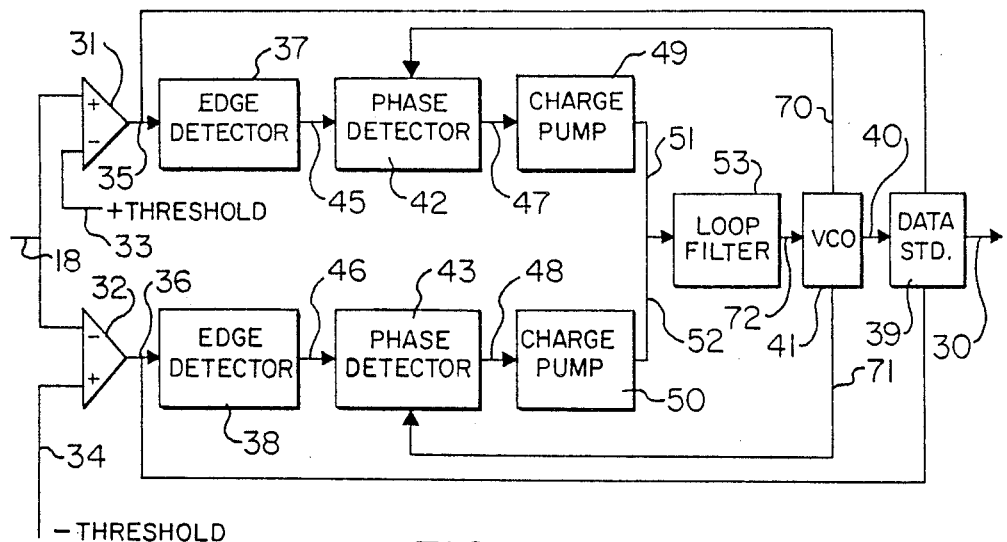
FIG. 2 shows a first embodiment of the invention, intended for exemplary use with an equalized and gain controlled Class IV partial response read signal of the type shown in FIG. 1, wherein the signal's binary information is conveyed by way of a positive signal magnitude, a zero signal magnitude and a negative signal magnitude, the positive and negative signal magnitudes being characterized as $+1$ and $-1$, respectively.

FIG. 2 discloses a first embodiment of the invention. In this figure analog signal 18 of FIG. 1 is applied to the input conductor that is identified by reference numeral 18. The output of the circuit network shown in FIG. 2 comprises conductor 30. Standardized binary data, such as is shown in FIG. 1 as "00011001000010110000", appears at conductor 30.

Reference numeral 31 identifies the + threshold detector means above mentioned with regard to FIG. 1, whereas numeral 32 identifies the — threshold detector means above mentioned with regard to FIG. 1.

The magnitude of the two thresholds are not to be limited to the exemplary $+\frac{1}{2}$ and $-\frac{1}{2}$ magnitudes, and in fact may be variable, as by way of variable reference voltages that are applied to conductors 33 and 34, respectively.

Signal 18 is applied to the "+" input of comparator 31, whereas this signal is applied to the "—" input of comparator 32. This causes the outputs 35,36 of the two comparators 31,32 to undergo a positive-going transition when a threshold crossing is detected in signal 18, the thresholds being established by the voltages on conductors 33,34. Edge detectors 37,38 are not polarity sensitive, and operate to output a pulse on conductors 45,46 whenever the signal on conductors 35,36 undergoes an edge transition.

Figure 4:
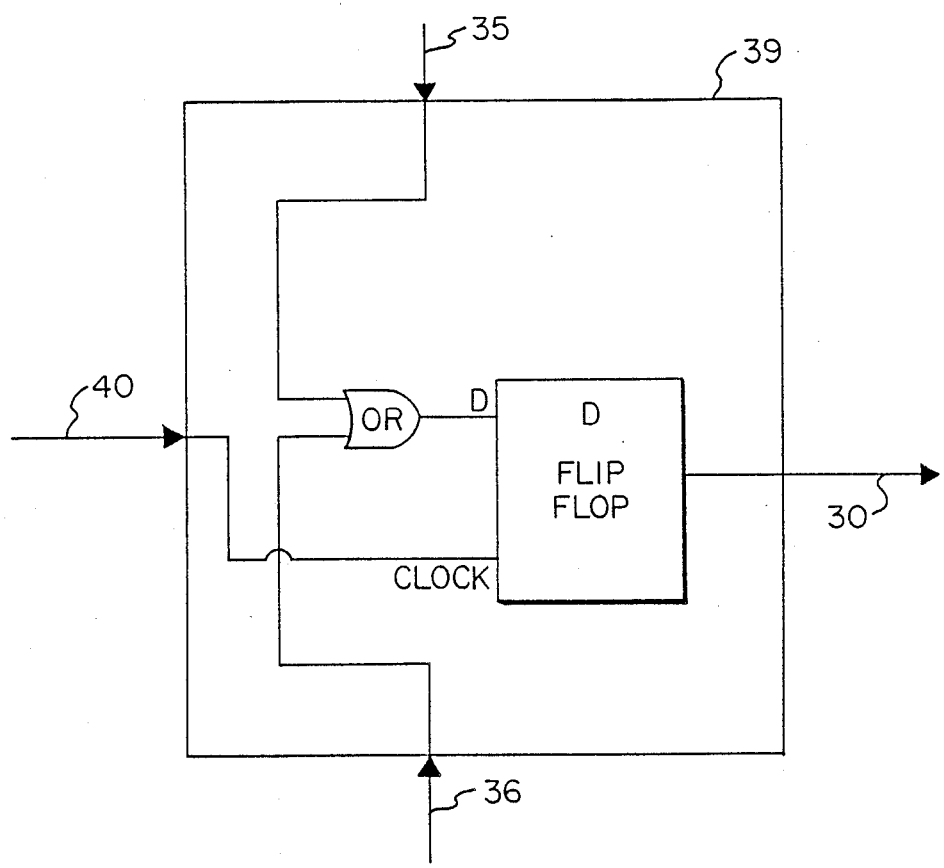
FIG. 4 shows an exemplary data standardization circuit means for use in the embodiments of FIGS. 2 and 3.

Stated differently, when at a sample-time a + signal exists at 18 that is more positive than + threshold 33, the output 35 of threshold means 31 goes +. Likewise, when at a sample-time, a — signal exists at 18 that is more negative than — threshold 34, then the output 36 of threshold means 32 goes +. In this way, the single OR circuit of FIG. 4 provides a high binary output (i.e. a "1") when either a signal above (i.e. more positive than) the "+ threshold" or below (i.e. more negative than) the "— threshold" appears at 18 coincident with a sample time.

As is well known by those skilled in the art, (assuming that + threshold 33 and — threshold 34 are $+\frac{1}{2}$ and $-\frac{1}{2}$, respectively) at the instant in time that the analog signal magnitude on conductor 18 becomes more positive than $+\frac{1}{2}$, a positive-going signal edge appears on conductor 35. Later in time, when signal 18 becomes less positive than $+\frac{1}{2}$, a negative-going signal edge appears on conductor 35.

Likewise, at the instant in time that the signal magnitude on conductor 18 becomes more negative than $-\frac{1}{2}$, a positive-going signal edge appears on conductor 36. Later in time, when signal 18 becomes less negative than $-\frac{1}{2}$, a negative-going signal edge appears on conductor 36. This is shown by the upper and lower dotted—line threshold detector output signals 35 and 36, respectively, of FIG. 1.

The nearly square wave positive signal pulses that occur on conductor 35 and conductor 36 as a result of FIG. 1's read signal 18 (see waveforms 35 and 36 of FIG. 1), are connected to data standardization circuit means 39. Circuit means 39 operates to decode the pulse outputs of threshold detector means 31 and 32, using the clock output 40 of clock means 41, to produce standardized binary data on conductor 30, in a manner well known to those skilled in the art. An exemplary circuit to be used at 39 is shown in FIG. 4, without limitation thereto. The described clock means can be used with more elaborate detector process means than that shown in FIG. 4, for example, the Maximum Likelihood Sequence Estimation (MLSE) and Viterbi detectors that are described in several of the documents above mentioned. Such more elaborate detector means would replace the means of FIG. 4 and would directly use the signal on input conductor 18 and the VCO signal on conductor 40. Timing would still be derived from the signals on conductors 35 and 36, or from equivalent signals if available as part of the data signal process.

Figure 3:
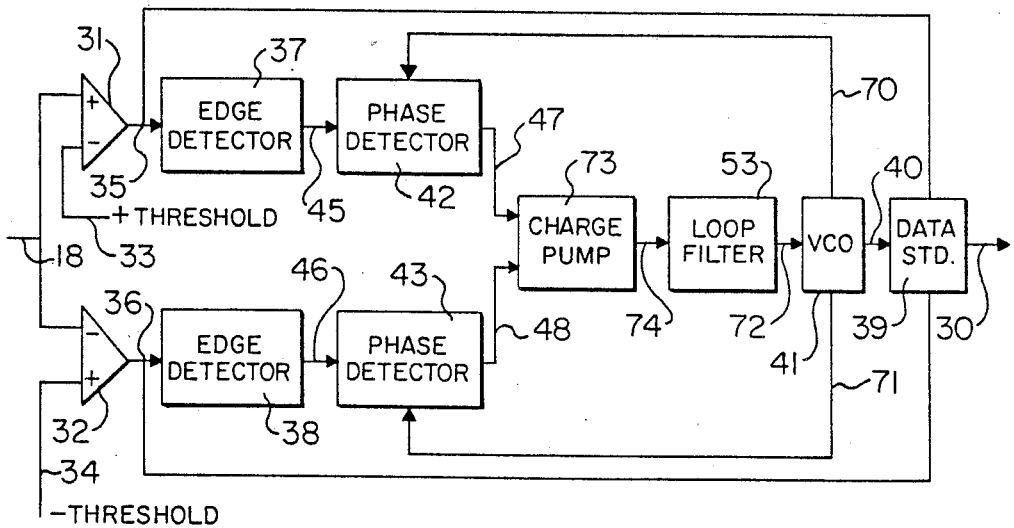
FIG. 3 shows a second embodiment of the invention, having a different charge pump means than FIG. 1.

In the embodiment of FIGS. 2 and 3, clock means 41 is shown as a clock whose frequency is voltage, or electrical parameter controlled; for example, means 41 is a VCO or a VFO.

Conductor 40 supplies the output of clock means 41 to data standardization circuit means 39, whereas conductors 70 and 71 supply the output of clock means 41 as an input to phase detectors 42 and 43, respectively. Conductor 72 comprises a control input for clock means 41 whereby the electrical parameter output of the loop filter operates to control the clock means.

The time of occurrence of the signal transitions or pulse edges of the square waves that appear on conductors 35 and 36 (these square waves are identified as 35 and 36 in FIG. 1) are detected by edge detector means 37 and 38, respectively.

In order to continuously synchronize clock means 41 to the time of occurrence at data sample times, as shown in FIG. 1, the output of clock means 41 is connected to one input of each of the phase detector means 42 and 43, whereas the output 45 of edge detector means 37 is connected to the second input of phase detector means 42, and the output 46 of edge detector means 38 is connected to the second input of phase detector means 43.

As a result of the above defined inputs to phase detector means 42 and 43, these two phase detectors operate to detect any phase error that may exist between the operating frequency of clock means 41 and the time of occurrence of the edge transitions of the square waves that exist on conductors 35,36, which square waves are produced as a result of plus and minus threshold detection of read signal 18.

The phase error, if any exists, appears on the output conductors 47 and 48 of phase detector means 42 and 43, respectively. This phase error, assuming such an error exists, is applied to current source charge pump means 49,50. These charge pumps are effective to provide output currents to output conductors 51,52. The total magnitude of the current from conductors 51,52 is a direct function of the magnitude of the phase error signals that exist on conductors 47,48 at any given time.

This phase error current signal from conductors 51,52 is in turn applied to loop filter means 53. Filter means 53 is constructed and arranged to average or integrate the phase error information 51,52 over a significant time period, so as to maintain the clock's feedback loop gain/phase relationship, and so as to maintain stability of the feedback loop whereby the output of clock means 41 is fed back to phase detector means 42,43.

One edge of clock signal 40 is thus maintained at the nominal position of signal 18's threshold crossing times. The signal being of a symmetrical shape allows use of the opposite edge to induce clocking of data at the sample times which are midway between threshold crossing edges of the clock.

In this new and unusual manner, a conventional VCO/VFO clock means 41 operates, in accordance with the invention, to clock read signal 18, and thereby enable data standardization means 39 to generate standardized binary data from analog read signal 18, means 39 providing this binary data as an output on output conductor 30.

An advantageous feature of the embodiment of FIG. 2 is that the two phase-detector / charge-pump circuit combinations are of the well known type presently used in prior peak detection schemes.

The embodiment of FIG. 3 is similar to the embodiment of FIG. 2, with the exception that the current source charge pump means of FIG. 3 comprises but a single network 73, having two inputs, rather than two separate networks as is shown in FIG. 2. Charge pump 73 is constructed and arranged to accept the close time-spacing of signals from phase detectors 42,43, such as can occur when certain binary data patterns are partial response coded to form analog signal 18.

It is to be noted that in the embodiments of the invention shown in FIGS. 2 and 3, the partial response signal has three critical signal amplitudes that are decoded into two binary states. Other partial response signaling systems are known where a different number of critical signal amplitudes are used. Generically, it can be said that a partial response signal has $N+1$ critical amplitudes. In the embodiments of FIGS. 2 and 3, $N+1=3$. In accordance with the invention, the number N of threshold detector means are provided. Therefor, in FIGS. 2 and 3 two such detector means are provided.

While the invention has been described in detail with reference to specific embodiments thereof, in order to enable those skilled in the art to practice the invention, and in order to disclose the best mode presently contemplated by the inventors for practicing the invention, the invention's scope and content are not to be limited to the specific embodiments shown and described. Rather, the invention's scope and content are to be as is defined by the following claims.

What is claimed is:

1. A method of correcting the phase of a data detection clock source means, said clock source means being adapted for use in detecting the binary data content of an analog partial response information signal, said partial response signal having $N+1$ signal levels that are indicative of said binary data, comprising;
   providing a controllable data detection clock source means,
   supplying said partial response signal to N threshold detectors, each individual one of which corresponds to a different one of said $N+1$ signal levels,
   providing N phase detector means,
   connecting the output of each individual one of said N threshold detectors, and the output of said data detection clock means, to each individual one of said N phase detector means, to thereby provide N individual phase error outputs, and
   connecting said N phase error outputs as a controlling input to said data detection clock source means.

2. The method of claim 1 including the step of edge detecting the output of each individual one of said N threshold detectors prior to connecting the output of each individual one of said N threshold detectors to each individual one of said N phase detector means.

3. The method of claim 2 wherein N is equal to two.

4. The method of claim 1 including the step of integrating said N individual phase error outputs prior to connecting the same as a controlling input to said data detection clock source means.

5. The method of claim 4 including the step of edge detecting the output of each individual one of said N threshold detectors prior to connecting the output of each individual one of said N threshold detectors to each individual one of said N phase detector means.

6. The method of claim 5 wherein N is equal to two.

7. The method of claim 1 wherein said data detection clock source means comprises VCO/VFO means, and including the step of providing charge pump means having an input connected to receive said N phase error outputs as a controlling input therefore, and including the step of providing loop filter means for averaging the output of said charge pump means prior to connecting the same as a controlling input to said VCO/VFO means.

8. The method of claim 7 including the step of edge detecting the output of each individual one of said N threshold detectors prior to connecting the output of each individual one of said N threshold detectors to each individual one of said N phase detector means.

9. The method of claim 8 wherein N is equal to two.

10. Apparatus for correcting the phase of data detection clock means, said clock means being adapted for use in detecting the binary data content of an analog partial response information signal, said partial response signal having a plurality of signal levels that are indicative of said binary data, comprising;
    controllable data detection clock means having a control input and a clock output,
    a plurality of threshold detector means,
       each individual one of said threshold detector means having an input and an output, and
       each individual one of said threshold detector means being responsive to an analog partial response input signal threshold that is related to an individually different one of said plurality of signal levels,
    a plurality of phase detector means,
       each individual one of said phase detector means having two inputs and an output,
    first connecting means for connecting the output of each individual one of said threshold detector means as a first input to an individual one of said phase detector means,
    second connecting means for connecting the output of said data detection clock means as a second input to each individual one of said phase detector means,
    said plurality of phase detector means thereby providing a like plurality of individual phase error outputs, and
    third connecting means connecting the outputs of said phase detector means as a controlling input to said data detection clock source means.

11. The apparatus of claim 10 wherein each individual one of said threshold detector means includes an edge detector means.

12. The apparatus of claim 11 wherein said third connecting means includes means for integrating said individual phase error outputs prior to connecting the same as a controlling input to said data detection clock means.

13. The apparatus of claim 12 wherein said plurality of signal levels is equal to three, and said plurality of threshold detector means and said plurality of phase detector means is equal to two.

14. The apparatus of claim 10 wherein said data detection clock means comprises VCO/VFO means, and wherein said third connecting means includes charge pump means having an input connected to receive said N phase error outputs as a controlling input for said charge pump means, and including loop filter means for averaging the output of said charge pump means prior to connecting the same as a controlling input to said VCO/VFO means.

15. The apparatus of claim 14 wherein each individual one of said threshold detector means includes an edge detector means.

16. The apparatus of claim 15 wherein said plurality of signal levels is equal to three, and said plurality of threshold detector means and said plurality of phase detector means is equal to two.

17. A method of correcting the phase of a data detection clock source means, said clock source means being adapted for use in detecting the binary data content of an analog partial response IV information signal, said partial response signal having a positive magnitude signal level, a zero magnitude signal level, and a negative magnitude signal level, all three magnitudes being indicative of said binary data content, comprising the steps of;
(1) providing a controllable data detection clock source,
(2) supplying said partial response IV signal as an input to two threshold detectors,
each of said threshold detectors having an input and an output,
the first of said threshold detectors being responsive to a positive non-zero threshold, and
the second of said threshold detectors being responsive to a negative non-zero threshold,
(3) providing first and second phase detector means,
(4) connecting the output of each individual one of said threshold detectors, and the output of said data detection clock, to each individual one of said phase detector means, to thereby provide two individual phase error outputs,
one of said phase error outputs being related to said positive non-zero threshold, and the other of said phase error outputs being related to said negative non-zero threshold, and
(4) connecting said two phase error outputs as a controlling input to said data detection clock source.

18. The method of claim 17 wherein step (4) includes the step of
(5) integrating said two individual phase error outputs prior to connecting the same as a controlling input to said data detection clock source.

19. The method of claim 17 wherein said data detection clock source comprises a variable frequency, voltage controlled means, and wherein said step (4) includes the steps of
(5) providing charge pump means having an input connected to receive said two phase error outputs as a controlling input therefore, and
(6) providing filter means for averaging the output of said charge pump means prior to connecting the same as a controlling input to said clock source.

20. The method of claim 17 wherein
said partial response signal positive magnitude signal level is characterized as +1,
said negative magnitude signal level is characterized as −1,
said first threshold detector is responsive to about a +½ threshold, and
said second threshold detector is responsive to about a −½ threshold.

21. The method of claim 18 wherein
said partial response signal positive magnitude signal level is characterized as +1,
said negative magnitude signal level is characterized as −1,
said first threshold detector is responsive to about a +½ threshold, and
said second threshold detector is responsive to about a −½ threshold.

22. Apparatus of establishing the phase of data detection clock source means,
said clock source means being adapted for use in detecting the binary data content of an analog partial response IV information signal,
said partial response IV signal having a positive magnitude signal level, a zero magnitude signal level, and a negative magnitude signal level, all three magnitudes of which are indicative of said binary data content,
the apparatus comprising;
controllable data detection clock source means,
first and a second threshold detector means,
each of said threshold detector means having an input connected to receive said partial response IV information signal, and
each of said threshold detector means having an output,
said first of said threshold detector means being responsive to a positive non-zero threshold, and
said second of said threshold detectors being responsive to a negative non-zero threshold,
first and second phase detector means, each having an input and an output,
first connecting means connecting the output of each individual one of said threshold detector means to the input of an individual one of said phase detector means,
second connecting means connecting the output of said data detection clock means to the input of said first and second phase detector means,
to thereby provide two individual phase error outputs,
one of said phase error outputs being related to said positive non-zero threshold, and
the other of said phase error outputs being related to said negative non-zero threshold, and
third connecting means connecting said two phase error outputs as a controlling input to said data detection clock source means.

23. The apparatus of claim 22 including,
means for integrating said two individual phase error outputs prior to connecting the same as a controlling input to said data detection clock source means.

24. The apparatus of claim 22 wherein said data detection clock source means comprises a variable frequency, charge controlled means, and including,
charge pump means having an input connected to receive said two phase error outputs as a controlling input therefore, and filter means for averaging the output of said charge pump means prior to connecting the same as a controlling input to said clock source means.

25. The apparatus of claim 22 wherein
said partial response IV positive magnitude signal level is characterized as +1,
said partial response IV negative magnitude signal level is characterized as −1,
said first threshold detector means is responsive to about a +½ threshold, and
said second threshold detector means is responsive to about a −½ threshold.

26. The apparatus of claim 23 wherein
said partial response IV positive magnitude signal level is characterized as +1,
said partial response IV negative magnitude signal level is characterized as −1,
said first threshold detector means is responsive to about a +½ threshold, and
said second threshold detector means is responsive to about a −½ threshold.

27. The apparatus of claim 24 wherein
said partial response IV positive magnitude signal level is characterized as +1,
said partial response IV negative magnitude signal level is characterized as −1,
said first threshold detector means is responsive to about a +½ threshold, and
said second threshold detector means is responsive to about a −½ threshold.

28. Apparatus for controlling the phase of data detection clock means that is used in the binary data detection of a partial response analog read signal, comprising;
a plurality of threshold detection channels, each channel comprising in series, a threshold detector, an edge detector, a phase detector and charge pump means, and each channel having the threshold detector thereof connected to receive a common partial response analog read signal as an input,
a junction for receiving the output of said charge pump means,
loop filter means having an output, and having an input connected to said junction,
data detection clock means having a clock output, and having a control input connected to the output of said loop filter means, and
means connecting the clock output of said data detection clock means to an input of the phase detector of each of said plurality of threshold detection channels.

29. The apparatus of claim 28 wherein said charge pump means comprises an individual charge pump in each of said plurality of threshold detection channels, said junction being common to the outputs of said individual charge pumps.

* * * * *